Dec. 27, 1927.
H. BROWN
BALL VALVE
Filed Feb. 18, 1927
1,653,619
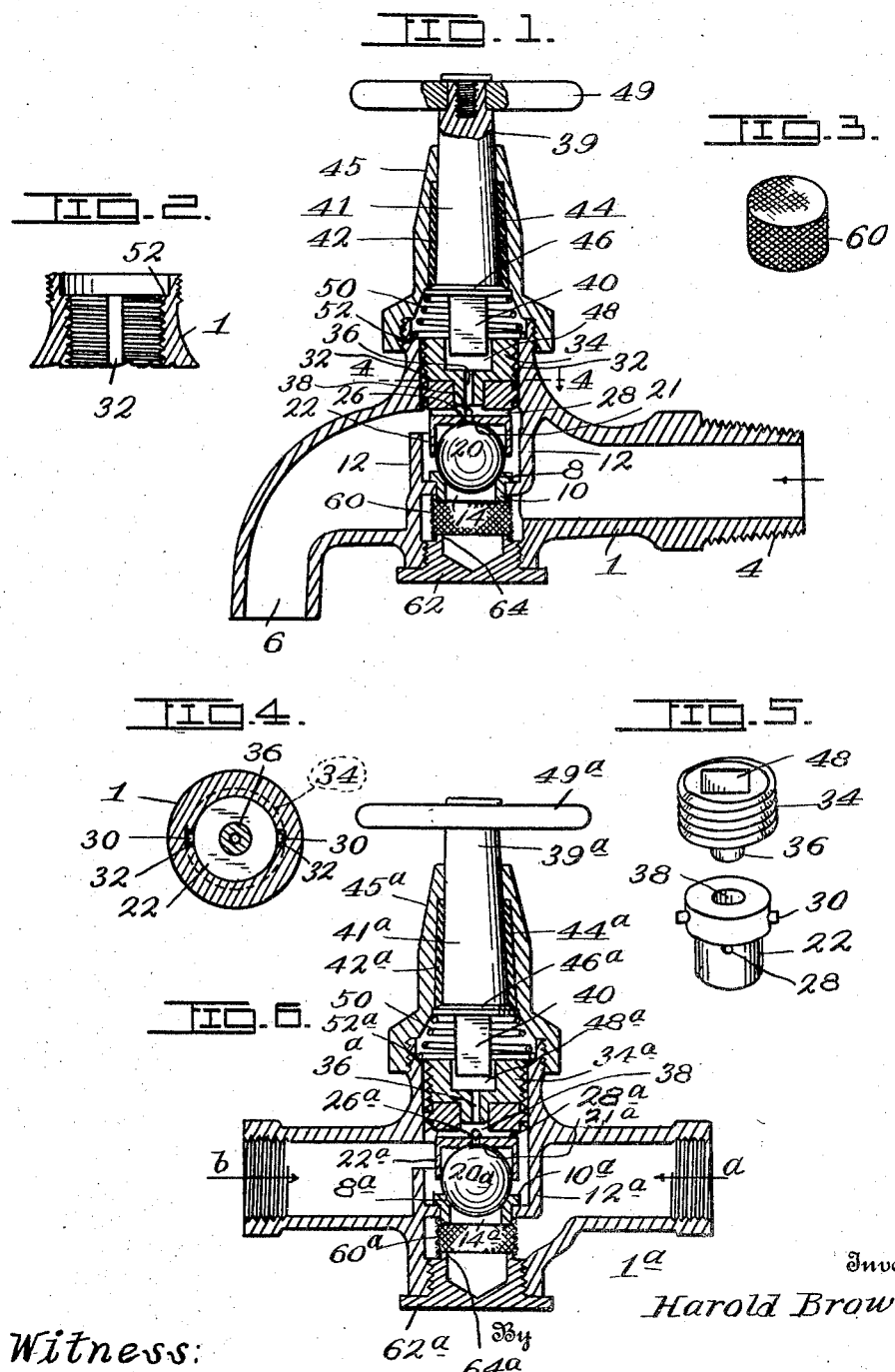
Inventor:
Harold Brown,
Witness:
Fred C. Fischer.
By
F. G. Fischer,
Attorney Patented Dec. 27, 1927.

UNITED STATES PATENT OFFICE.

HAROLD BROWN, OF KANSAS CITY, KANSAS.

BALL VALVE.

Application filed February 18, 1927. Serial No. 169,278.

My invention relates to valves and the present invention is an improvement over the valve disclosed by my copending application filed August 19, 1926, Serial No. 130,190. The new features of the invention include controlling means for forcing the ball plug to its seat without turning said ball plug and thereby possibly scarring or otherwise damaging the latter and said seat.

Another feature consists of a screen which strains out all grit, sediment and metal particles from the fluid and prevents them from lodging between the ball plug and its seat and thereby possibly damaging the same.

Other features will hereinafter appear and in order that the invention may be fully understood, reference will now be had to the accompanying drawing, in which:

Fig. 1 is a vertical longitudinal section of the valve constructed in the form of a faucet.

Fig. 2 is a fragmentary cross section of the upper portion of the valve casing.

Fig. 3 is a detail perspective view of the screen.

Fig. 4 is a cross section on line 4—4 of Fig. 1.

Fig. 5 is a detail perspective view of a cage for the ball plug, and a vertically adjustable member for forcing said cage downwardly upon said ball plug.

Fig. 6 is a vertical longitudinal section of the valve constructed in the form of a feed and check valve.

Referring more particularly to the form disclosed by Figs. 1 to 5, inclusive, 1 designates the valve casing which is provided at its inlet end with threads 4 and at its opposite end with a discharge nozzle 6.

8 designates a seat formed in a bushing 10 arranged in a partition 12, which is cast integral with the intermediate portion of the casing 1. The bushing 10 has a port 14 for the passage of water, steam, or other fluid, and said port 14 is normally closed by a ball plug 20. The partition 12 projects upwardly around the ball plug 20 for directing the fluid upwardly against and around said ball plug 20 when opened, to hold it in a cage 22 which is provided with communicating relief ports 26 and 28 and a pair of diametrically-disposed lugs 30, which operate in a pair of diametrically-disposed grooves 32 arranged vertically within the casing 1. The cage 22 is provided with a seat 21 for engaging the upper portion of the ball plug 21, as shown by Fig. 1.

34 designates a vertically adjustable member threaded in the valve casing 1 and provided with a depending axial nipple 36 arranged to rotate in an opening 38, in the upper portion of the cage 22 and communicating with the relief ports 26 and 28, the relief port 26 extending to the ball plug.

39 designates a valve stem having a lower portion 40 and a conical upper portion 41, which latter is journaled in a corresponding bushing 42 arranged within a cap 45 threaded upon the casing 1. Although the bushing 42 seats tightly within the cap 45, said bushing when worn out may be removed and another substituted in order that a fluid-tight joint can be maintained between it and the conical upper portion 41 of the valve stem 39. The stem 39 is also provided with a conical collar 46 which fits snugly against the lower end of the bushing 42 to assist in maintaining a fluid-tight joint between the stem and said bushing. The lower portion 40 of the valve stem 39 is rectangular in cross section and fits into a corresponding recess 48 in the adjustable member 34, so that when said valve stem 39 is rotated to open or close the valve it will also rotate said member 34. The upper end of the valve stem 39 projects through the upper end of the cap 45 and is provided with a handle 49 whereby it may be rotated.

A coil spring 50 is interposed between the collar 40 and an annular shoulder 52 in the upper portion of the valve casing 1. Said spring 50 exerts upward pressure on the valve stem 39 to hold the conical upper portion 41 and the collar 46 snugly against the bushing 42, so that there will be no leakage of fluid through the top of the cap 45.

60 designates a strainer preferably of tubular form interposed between the inlet end of the valve casing 1 and the port 14, for preventing sand, grit, or other foreign matter from being carried by the fluid between the ball plug 20 and the seats 8 and 21 and scarring or otherwise damaging said ball plug and seats. For convenience in installing the strainer 60, I have provided the lower portion of the valve casing 1 with an opening in axial alignment with the bushing 10, the lower end of which latter projects through the partition 12 and enters the upper end of the strainer 60 to hold it in place. Said opening is normally closed by an inverted screw cap 62 having a reduced end 64 which fits into the lower end of strainer 60 and coacts with the bushing 10 in holding said strainer in place.

In order to open the valve for the passage of fluid the handle 49 is rotated in the proper direction for causing the adjustable member 34 to move upwardly so that the fluid pressing against the under portion of the ball plug 20 can raise the latter from its seat 8 and cause it to push the cage 22 upwardly and hold it in contact with the underside of said member 34. Any fluid which may pass between the ball plug 20 and the seat 21 in the cage 22 is free to escape through the relief ports 26 and 28 and thereby let the ball plug 20 come in direct contact with said seat 21 where it is held against rotation by the upward pressure of the fluid passing through the port 14. The escape of any fluid from between the ball plug 20 and the seat 21 is hastened by the suction of the fluid directed upwardly by the tubular portion of the partition 12. As a ground joint is provided between the portions 41 and 44 of the valve stem 39 and the bushing 42, respectively, leakage of fluid through the top of the valve cannot occur. In order to close the valve the handle 49 is rotated in a reverse direction to that at which it was rotated to open the valve. This causes the valve stem 39 to rotate the member 34 which is carried downwardly by its screw threads and in turn forces the cage 22 downwardly until the ball plug 20 is seated in the bushing 10. The cage 22, however, is prevented from rotating with the member 34 by the lugs 30 operating in the vertical grooves 32, and hence danger of scarring or otherwise damaging the ball plug 20 and its seats 8 and 21 is avoided.

The construction and operation of the valve disclosed by Fig. 6, is similar to that of the valve disclosed by Fig. 1, as is evidenced by corresponding reference numerals with exponents "a," the chief difference being that when the modified form of valve is opened to permit fluid to pass in the direction of the arrow $a$ any reversal of the fluid in the direction of the arrow $b$ will instantly cause the ball plug 20 to engage the seat 8ª and thus prevent the fluid from flowing backwardly through the valve.

In addition to the forms disclosed by the drawing, I reserve all rights to such other forms and modifications as properly fall within the spirit and scope of the invention as claimed.

Having thus described my invention, what I claim and desire to secure by Letters Patent, is:

1. In a valve of the character described, a casing having a partition with a port extending therethrough, a plug for normally closing said port, a movable cage seated on said plug and provided with communicating relief ports, one of which extends to the plug, lugs on said cage projecting into grooves in the casing to prevent rotation of said cage, a member threaded in the casing and engaging said cage, and manually controlled means engaging said threaded member for rotating and causing the latter to control the movement of the plug.

2. A valve of the character described consisting of a casing having a partition with a port extending therethrough, a plug for opening and closing said port, a cage movably mounted in the casing and held from rotation and embracing said plug, a member threaded in the casing and engaging said cage, an axial nipple on said threaded member projecting into an opening in the cage, a valve stem having a conical portion and engaging said threaded member for rotating and causing the latter to control the movement of the plug, a bushing in which said valve stem is journaled, and a cap on the casing and in which said bushing is mounted.

3. A valve of the character described consisting of a casing having a partition with a port extending therethrough, a ball plug for opening and closing said port, a cage movably mounted in the casing and held from rotation and engaging said ball plug, a member threaded in the casing and engaging said cage, a valve stem having a conical portion and a collar and adapted to rotate said threaded member to cause the latter to control the movement of the ball plug, a bushing snugly fitting said conical portion and said collar, a cap mounted upon the casing and in which said bushing snugly fits, and a spring interposed between the casing and said collar.

4. In a valve of the character described, a casing having an opening therein, a screw cap for closing said opening, a ball plug, a partition in the casing and extending upwardly and around said ball plug, a bushing extending through said partition having a seat for the ball plug and arranged in axial alinement with said screw cap, and a tubular strainer engaging said bushing and said screw cap.

In testimony whereof I affix my signature.

HAROLD BROWN.